United States Patent [19]
Ford

[11] Patent Number: 5,497,457
[45] Date of Patent: Mar. 5, 1996

[54] REDUNDANT ARRAYS OF INDEPENDENT LIBRARIES OF DISMOUNTABLE MEDIA WITH PARITY LOGGING

[75] Inventor: Daniel A. Ford, Los Gatos, Calif.

[73] Assignee: International Business Machines Corporation, Armonk, N.Y.

[21] Appl. No.: 324,428

[22] Filed: Oct. 17, 1994

[51] Int. Cl.$^6$ ................................................. G06F 11/00
[52] U.S. Cl. ............................... 395/182.04; 395/182.13
[58] Field of Search ................................. 395/575, 425, 395/600, 182.04, 182.13; 371/40.4, 10.1, 40.1

[56] References Cited

U.S. PATENT DOCUMENTS

| | | | |
|---|---|---|---|
| 4,761,785 | 8/1988 | Clark et al. | 371/51 |
| 5,197,055 | 3/1993 | Hartung et al. | 369/34 |
| 5,309,451 | 5/1994 | Noya et al. | 371/40.4 |
| 5,388,260 | 2/1995 | Monahan et al. | 395/600 |
| 5,390,327 | 2/1995 | Lubbers et al. | 395/575 |
| 5,398,253 | 3/1995 | Gordon | 371/40.4 |

FOREIGN PATENT DOCUMENTS

| | | | |
|---|---|---|---|
| 556945A2 | 8/1993 | European Pat. Off. | G06F 11/20 |
| WO91/16711 | 4/1990 | WIPO | G11B 20/18 |
| WO91/20025 | 6/1990 | WIPO | G06F 3/06 |
| WO91/20076 | 6/1990 | WIPO | G11B 5/012 |
| WO93/23803 | 5/1992 | WIPO | G06F 3/06 |

OTHER PUBLICATIONS

Drapeau et al., "Striped Tape Arrays", Twelfth IEEE Symposium on Mass Storage Systems, 1993, pp. 257–265.
Kim, "Synchronized Disk Interleaving", IEEE Transactions on Computers, vol. C–35, No. Nov. 11, 1986, pp. 978–988.
Kohl et al., "Highlight: A File System for Tertiary Storage", Twelfth IEEE Symposium on Mass Storage Systems, 1993, pp. 157–161.
Louis et al., "Safeguarding of Stored Records Against Total Data Loss", IBM Technical Disclosure Bulletin, vol. 14, No. 12, May 1972, p. 3846.
Patterson et al., "A Case for Redundant Arrays of Inexpensive Disks (RAID)", ACM, 1988, pp. 109–116.
Rosenblum et al., "The Design and Implementation of a Log–structured File System", ACM, 1991, pp. 1–15.
Stodolsky et al., "Parity Logging—Overcoming the Small Write Problem in Redundant Disk Arrays", 20th Annual International Symposium on Computer Architecture, May 1993, pp. 1–12.

*Primary Examiner*—Robert W. Beausoliel, Jr.
*Assistant Examiner*—Ly V. Hua
*Attorney, Agent, or Firm*—Thomas R. Berthold

[57] ABSTRACT

A redundant array of independent data storage libraries of dismountable media units includes parity logging and unique parity update reintegration techniques to improve system performance by reducing the number of media mounts. The media units are arranged into redundancy groups that store the data as sets or parity groups of data blocks and a corresponding parity block. When new data is to be written parity updates are computed and stored in a parity log in nonvolatile storage, such as a magnetic fixed disk drive. The new data blocks are then written onto the media units, but the corresponding new parity blocks are not written if the media units containing the old parity blocks are not mounted at the time the parity updates are computed. If a media unit containing an old parity block is already mounted at the time the parity update is computed, then a new parity block is computed based on the parity update and the new parity block is written to the media unit without logging the parity update. When the media unit containing the old parity block is later mounted on a drive for doing a read or write operation, then the parity update is retrieved from the parity log and the new parity block computed and written to that media unit. The reintegration of parity updates is enhanced by parity pursuit striping wherein successive striping increments of data blocks are mapped across the media units such that a striping increment is located on the same media unit that contains the parity block corresponding to the prior striping increment.

16 Claims, 8 Drawing Sheets

|   |   |
|---|---|
| 0 | P |
| P | 1 |

*FIG. 6A*

| 3 | 1 | P |
|---|---|---|
| 0 | P | 4 |
| P | 5 | 2 |

*FIG. 6B*

| 6  | 8 | 2 | P |
|----|---|---|---|
| 10 | 1 | P | 3 |
| 0  | P | 4 | 7 |
| P  | 5 | 11| 9 |

*FIG. 6C*

| 13 | 18 | 9  | 3  | P  |
|----|----|----|----|----|
| 16 | 11 | 2  | P  | 4  |
| 8  | 1  | P  | 5  | 14 |
| 0  | P  | 6  | 17 | 10 |
| P  | 7  | 15 | 12 | 19 |

*FIG. 6D*

| 10 | 28 | 25 | 16 | 4  | P  |
|----|----|----|----|----|----|
| 22 | 12 | 18 | 3  | P  | 5  |
| 15 | 20 | 2  | P  | 6  | 26 |
| 24 | 1  | P  | 7  | 13 | 17 |
| 0  | P  | 8  | 27 | 19 | 11 |
| P  | 9  | 14 | 21 | 23 | 29 |

REDUNDANT ARRAYS OF INDEPENDENT LIBRARIES OF DISMOUNTABLE MEDIA WITH PARITY LOGGING

TECHNICAL FIELD

This invention relates to data storage library arrays of dismountable media, such as optical disks and tape cartridges, and in particular to such arrays with improved handling of redundancy parity information.

BACKGROUND OF THE INVENTION

An optical disk or a magnetic tape library (also called a "jukebox") is a mechanical device capable of mounting units of storage media (e.g., disks or tape cartridges) on a drive in response to access requests from a host computer system. A library usually comprises a set of one or more drives, a storage area for unmounted media, recording media, and a robot picker mechanism (possibly more than one) that moves the recording media between the storage area and the drives. Libraries range in physical size from that of a small room containing 1,000 or more media units to a desk top unit containing as few as 8 media units. The storage capacity of the largest library systems is in the terabyte range, while the smallest libraries may have capacities of only 1 gigabyte.

Library systems are used in many applications and generally perform their function in a satisfactory manner. There is, however, much room for improvement in the reliability, performance, and flexibility of conventional systems. For instance, most libraries have only one picker mechanism for transporting media to and from its drives. This characteristic is a single mechanical point of failure and represents a major weakness in the reliability of a library. If and when a picker fails, all of the data stored in such a library, possibly terabytes, is inaccessible until the picker is repaired.

In co-pending application Ser. No. 08/142,534, filed Oct. 25, 1993, a Redundant Array of Independent Libraries (RAIL) is described wherein data stored on dismountable media is protected by storing redundant parity information on a separate storage unit. Different configurations for the placement of redundant parity information in arrays of magnetic fixed disks have been described by Patterson et al., "A Case for Redundant Arrays of Inexpensive Disks (RAID)", *Proceedings of ACM SIGMOD*, Chicago, Ill., Jun. 1–3, 1988, pp. 109–116. The RAIL parity storage unit is often another unit of dismountable media like that used to store data. When data is read from a data media unit, only that unit, and not the unit storing parity, need be mounted in the array. When data is written, however, both the data media unit and the parity media unit need to be mounted on drives to have both of their values updated. This requirement to mount two separate media units to perform one write can impose a severe performance penalty on a mass storage system constructed from dismountable media. This is because the major performance limitation of any library of dismountable media is the time required to mount and dismount media units. Separate media units in a library can only be accessed at the rate at which the picker can move the units to and from the drives. Optical disk libraries can require tens of seconds to complete a disk exchange, and tape libraries require even more time.

In magnetic fixed disk RAID systems, a parity logging technique has been proposed to improve the efficiency of writing new parity. Logging is a well known technique for improving performance in computer data storage systems by transforming many small operations into one larger more efficient one. The parity logging technique proposed for RAID systems has been found, through simulation, to improve small write performance by transforming small single block transfers into larger, more efficient, track and cylinder transfers. This technique is described by Stodolsky et al., "Parity logging—Overcoming the Small Write Problem in Redundant Disk Arrays", *20th Ann. Int. Symposium On Computer Architecture*, May 16–19, 1993, San Diego, Calif. However, such a technique is not of significant value in a RAIL storage system because the main performance bottleneck, unlike a magnetic fixed disk RAID system, is not the time penalty of a media data transfer operation, but the time penalty of a media mount. For instance, a typical optical disk drive can perform 400 to 500 random single block accesses in the time it takes to exchange a single optical disk. Also, such a technique reserves a fixed set of parity log blocks (called parity log regions) with a strict one-to-one mapping between parity blocks and parity update blocks, which effectively doubles the amount of redundant data that must be stored. This is not feasible in a library array where it is expected that the amount of stored parity information will be very large (possibly terabytes for some systems). It would be economically and architecturally prohibitive to supply a matching amount of magnetic fixed disks or other nonvolatile storage to store the parity log.

What is needed is a data storage array of libraries of dismountable media that includes a system for efficiently and reliably handling redundant parity information.

SUMMARY OF THE INVENTION

The present invention is a data storage array of libraries of dismountable media units that includes parity logging and unique parity update reintegration techniques to improve system performance by reducing the number of media mounts. The array includes a plurality of data storage drives with each drive having an associated set of at least two dismountable media units. The media units are arranged into redundancy groups that store the data as sets of data blocks and a corresponding parity block. When new data is to be written the parity updates are computed and stored in a parity log in nonvolatile storage, such as a magnetic fixed disk drive. The new data blocks are then written onto the media units without writing the corresponding new parity block if the media unit containing the corresponding parity block to be updated is not mounted. This delays the need to mount the media containing the parity until a later time when it will be more efficient. If the media unit containing the parity block to be updated is already mounted at the time the parity update is computed, then the new parity block is computed and written to the media unit without logging the parity update. When the media unit containing the parity block to be updated is mounted on a drive for doing a read or write operation then the parity update is retrieved from the parity log, and the new parity block is computed and written to that media unit. The reintegration of parity updates is enhanced by parity pursuit striping wherein the striping increments of data blocks are mapped across the media units such that the next logically successive striping increment is located on the same media unit that contains the parity corresponding to the logically prior striping increment.

For a fuller understanding of the nature and advantages of the present invention, reference should be made to the following detailed description taken together with the accompanying figures.

DETAILED DESCRIPTION OF THE INVENTION

Redundant Arrays of Independent Libraries (RAIL)

Figure 1:
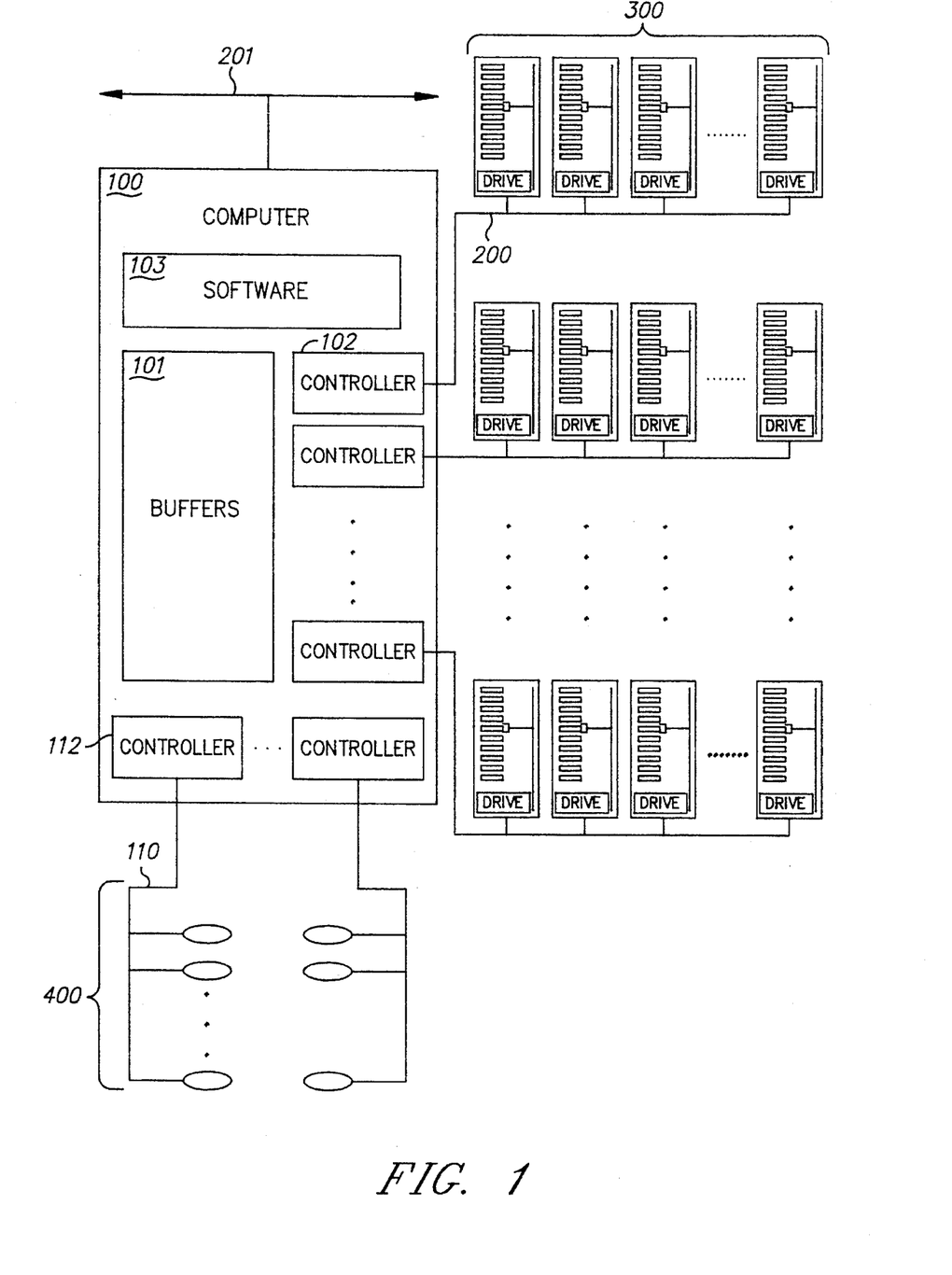
FIG. 1 is a block diagram of a host computer system attached to a general RAIL system.

An array of libraries comprises two or more libraries connected to a computer or controller and organized in such a manner that logical units of data are stored on more than one of the libraries. The diagram of FIG. 1 illustrates the system. The computer 100 of the array of libraries contains buffers 101 stored either in main memory or on nonvolatile secondary storage devices (e.g., fixed disks 400) and one or more interface controllers (one for each interface bus used in the array), such as typical controller 102 attached to typical interface bus 200. The buffers 101 store the results of recent library access requests so that some future requests can be resolved without accessing the libraries. Some buffers 101 are also used to reorganize data as it moves between the array of libraries and the computer 100. The computer 100 may be attached to a communications channel, such as a network 201, over which it transmits and receives access requests and data.

Attached to each interface bus in the array, such as typical bus 200, are one or more libraries of dismountable storage media (optical disk or tape cartridges), such as the typical string of libraries 300. The array includes not just those individual libraries attached to one interface controller (such as libraries 300 on bus 200 attached to controller 102), but all other libraries on other buses in the system. Also attached to the computer 100 are a number of other secondary storage devices, such as typical optical or magnetic fixed disks 400 connected by interface bus 110 to controller 112. A software routine 103 runs on the computer 100 and accepts access requests for a storage device and translates those requests into one or more access requests to one or more of the libraries in the array.

The manner in which access requests to the library storage device represented by the array are translated into requests to the individual libraries that make up the array depends upon the configuration of the array itself. The distinguishing features of the various types of array architectures are the manner in which data is spread across the libraries and the placement of redundant data.

Preferred Embodiment

Figure 2:
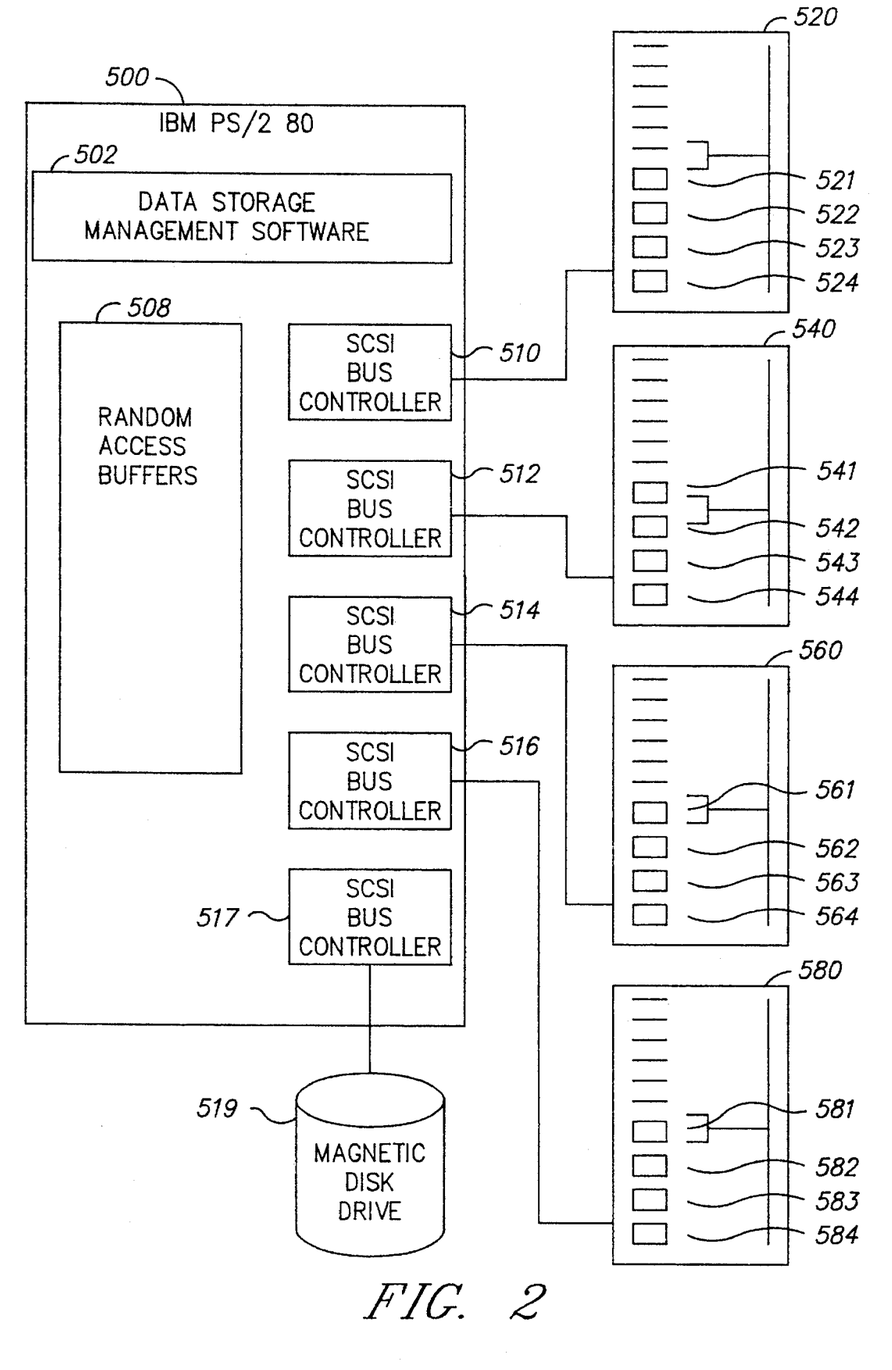
FIG. 2 is a block diagram illustrating a preferred embodiment of a RAIL system having four independent optical disk libraries and a magnetic fixed disk drive for parity logging attached to a host computer.

The preferred configuration of the present invention is illustrated in FIG. 2 and comprises the following main components: a host computer 500 in the form of an IBM PS/2 Model 80 with 16 Megabytes of semiconductor main memory 502, a 100 megabyte magnetic disk drive 519 attached to the computer 500, and four IBM Model 3995 optical disk libraries 520, 540, 560, 580. The host computer 500 may be a dedicated computer whose primary function is to manage the data storage and retrieval on the libraries, such as would be the case in a network of other computers whose function is to run specific software applications. Alternatively, computer 500 may run other software applications as well as manage the data storage on the libraries.

The libraries 520, 540, 560, 580 are attached to the computer 500 by individual industry standard Small Computer System Interface (SCSI) buses that are attached to respective SCSI controllers/adapters 510, 512, 514, 516. Other hardware and software subcomponents of the system reside inside the computer 500 and the libraries 520, 540, 560, 580. The data storage management software program that includes routines for managing the writing of data and parity, including media mounts and drive accesses, is stored on the magnetic fixed disk drive 519. In operation, a copy of the program or portions of the program are loaded into the main memory 502 of the computer 500 when needed. In addition to SCSI bus controllers/adapters 510, 512, 514, 516 the hardware in the computer also includes SCSI bus controller/adapter 517 attached to fixed disk drive 519 and random access memory buffers 508.

Inside each of the libraries 520, 540, 560, 580 are four optical disk drives: drives 521–524 in the first library 520; drives 541–544 in the second library 540, drives 561–564 in the third library 560, and drives 581–584 in the fourth library 580. Each library 520, 540, 560, 580 also includes a storage space for optical disks and a picker to mount and dismount disks from the drives.

The data architecture that will be described for use with the present invention is the RAID 5 architecture. In a RAID 5 architecture data and parity are distributed or "striped" across all the available storage units (e.g., the dismountable optical disks on the individual drives in the case of an optical disk library). Typically the addressable blocks in "N+1" storage units in a set (or redundancy group) are divided into a plurality of equally sized striping increments. A striping increment can be a single block, but is typically made up of multiple blocks. Each storage unit in the redundancy group contains the same number of striping increments. Striping increments from each storage unit in a redundancy group having the same storage unit physical block address ranges form a data set (also called a parity group). Each parity group has N striping increments of data, plus 1 parity stripe on a storage unit that contains parity for the remainder of the parity group. For example, in the case of N=3, data and parity can be striped across media units associated with drives 521, 541, 561 and 581. The first parity group would place blocks of data on media units in drives 521, 541 and 561, and parity on the media unit in drive 581. Additional parity groups each have a parity stripe, but the parity stripes are distributed on different media units. Thus, for example, the second parity group would have a parity stripe placed on the media unit in drive 521. A limitation of a RAID 5 architecture is that a change in a data block requires reading the old data block, reading the old parity, reconstructing the new parity, and writing the new data block and new parity. In the case of a library with dismountable media, the writing of the new data and new parity thus requires that both the media unit storing data and the media unit storing the parity be mounted. It is the solution to this problem that is the subject of the present invention.

RAIL Parity Logging

In the present invention, when a data block is to be written to the RAIL system the new data block is accepted and stored in a nonvolatile buffer. If the media unit that contains the old data block is not currently mounted, a mount request is issued and then when complete the contents of the block stored on the media unit are retrieved and stored in another buffer. The old and new versions of the block are then Exclusive OR'd (XOR'd) together to form a parity update which is stored in a buffer (likely the same buffer as the old data block). The new data is written to the media unit and the parity update stored in a parity log maintained in nonvolatile storage. If a cache is present, data can be stored and retrieved from the cache.

The parity log is organized as a linked list of parity update blocks, one for each media unit in the array. There is no fixed mapping between parity update blocks in the parity log and parity blocks on the media units, nor are the update blocks required to be contiguous in the parity log. This approach is different from that taken for magnetic disk parity logging which reserves a fixed set of parity log blocks (called parity log regions) with a strict one-to-one mapping between parity blocks and parity update blocks, as described in the previously cited Stodolsky article.

Figure 3:
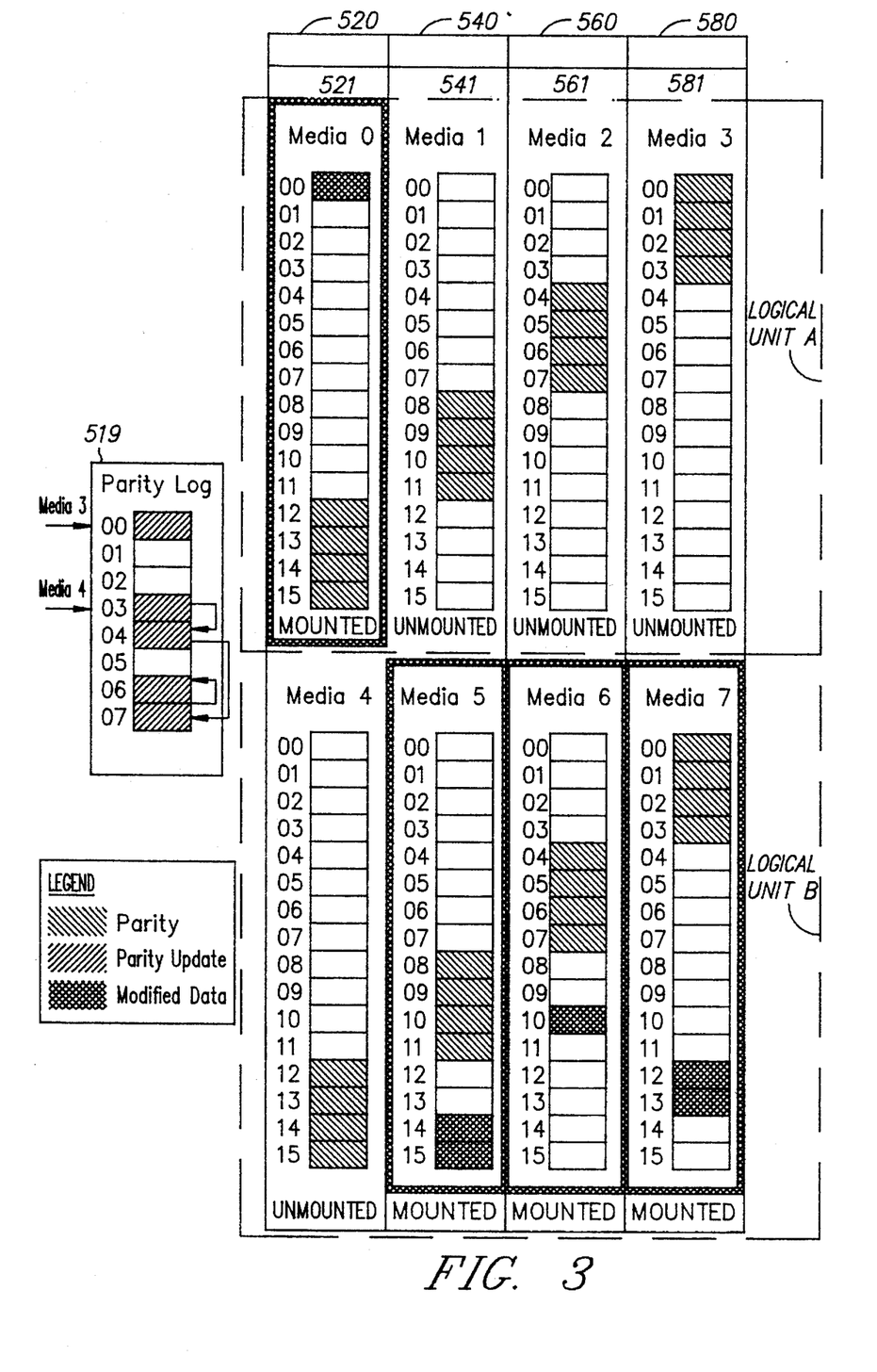
FIG. 3 is a block diagram illustrating parity logging for two logical units made up of the four arrays in the system of FIG. 2, each array being shown with only two media units.

An example of a parity logging scenario is illustrated in FIG. 3 and will be explained with reference to the library array of FIG. 2. Each of the four drives 521, 541, 561, 581 (each being a drive from one of the four libraries 520, 540, 560 and 580) is depicted with two optical disks, each disk being a separate media unit. Only one of the two disks can be mounted on its associated drive at a time. Media 0 and 4 are in the first library 520, media 1 and 5 in the second library 540, media 2 and 6 in the third library 560 and media 3 and 7 in the fourth library 580. The array is organized as two redundancy groups or logical units A and B (media 0–3 and media 4–7, respectively) each of which employs a RAID 5 architecture. A logical unit is a separate, linearly addressable sequence of fixed length blocks. A RAIL architecture may present its storage capacity as a single logical unit, or multiple (smaller capacity) logical units. Each logical unit stripes its data as data blocks across some set of the dismountable media in the array.

The striping increment for both logical units in the example of FIG. 3 is four blocks (e.g., blocks 00–03 on media 0 is one striping increment). A data set or parity group is the three striping increments in the same physical address blocks in a redundancy group (e.g., blocks 00–03 on each of media units 0–2 in logical unit A) plus the corresponding parity stripe (e.g., blocks 00– 03 on media 3). Media from either logical unit A or B can be mounted and accessed. In the example in FIG. 3, media 0 of the logical unit A is mounted on drive 521 in library 520, while media 5, 6 and 7 of logical unit B are mounted on drives in their respective libraries (the solid line around a media in FIG. 3 indicates it is mounted). Media 1, 2, 3 in logical unit A and media 4 in logical unit B are unmounted or stored within their respective libraries and accessible only if retrieved by the picker. The parity log for the array is shown as a separate sequence of blocks, with a capacity of 8 blocks, that is stored in nonvolatile memory (i.e., magnetic fixed disk drive 519).

The example of FIG. 3 shows the state of the array after a series of writes of modified data to blocks in both logical units A and B. Those writes map to media 0 block 00, to media 5 blocks 14–15, to media 6 block 10, and to media 7 blocks 12–13. The write to media 0, block 00 caused the parity block in unmounted media 3, block 00 to become out-of-date. Because media 3 is not mounted the parity update value (computed by XOR'ing the new data with the old data in media 0 block 00) is stored in the parity log in block 00. Similarly, the writes to media 5, blocks 14–15, and to media 7, blocks 12–13, have made the corresponding parity stored in stored media 4, blocks 12–15, to become out-of-date. These parity update values are stored in the parity log as a linked list of blocks starting from block 03.

As shown in FIG. 3 the blocks of parity update values in the parity log are not contiguous. Some aspects of the parity reintegration process to be described below may be improved if the blocks in the parity log were contiguous, but providing contiguity would require either fixed storage allocations (one for every parity block in the array), or so much reorganization overhead that it would likely negate the gains in parity reintegration performance.

The write to media 6, block 10 permitted the parity update to be computed (by XOR'ing the old data and the new data) and the new parity block computed (by XOR'ing the parity update and the old parity block) and written in media 5, block 10 because media 5 was already mounted. Thus, this parity update does not result in an entry in the parity log. This approach of not logging the parity update if the media containing the parity block is already mounted is quite different from the operation of parity logging as proposed for magnetic disk RAID systems. In that technique, as described in the previously cited Stodolsky article, the parity update value is logged and the computation and writing of new parity is delayed until an entire track (or some other large unit) is available for data transfer. This makes the updating of parity more efficient than a single block update. While in principle that technique should also improve parity updates to mounted media in a RAIL storage system, in practice other concerns unique to dismountable media dominate. In an array of dismountable media, each media unit is a candidate for immediate dismount and may be selected at any moment due to the demands of the particular work load from the host computer. Delaying parity reintegration until media dismount time will delay the dismount and reduce performance. Also, leaving the parity update value in the parity log and not writing the new parity will clutter the parity log and could force an otherwise unnecessary mount later to flush the parity log to make room for future writes. In summary, mounting and dismounting media is so expensive in terms of time penalties that wasting the opportunity to write new parity when a media is already mounted can seriously degrade performance of the library array.

Opportunistic Reintegration of Parity Updates

An important aspect of the present invention employing parity logging for RAIL systems is that of opportunistic reintegration of parity. This means that the reintegration of parity update values from the parity log into new parity for any unmounted media unit is delayed until that media unit is mounted for reasons other than writing the new parity (i.e., to read or write data). By delaying the writing of new parity until the media unit is mounted for a data access, parity writes are piggy-backed onto the mount time overhead associated with data accesses. The characteristic access skew "flatting" that data striping provides, because it systematically distributes small portions of the data (striping increments) among the media units in a redundancy group, will result in periodic mounting of all media units in the array, and along with the mounting, the subsequent writing of new parity using the stored parity update values from the parity log.

Figure 4:
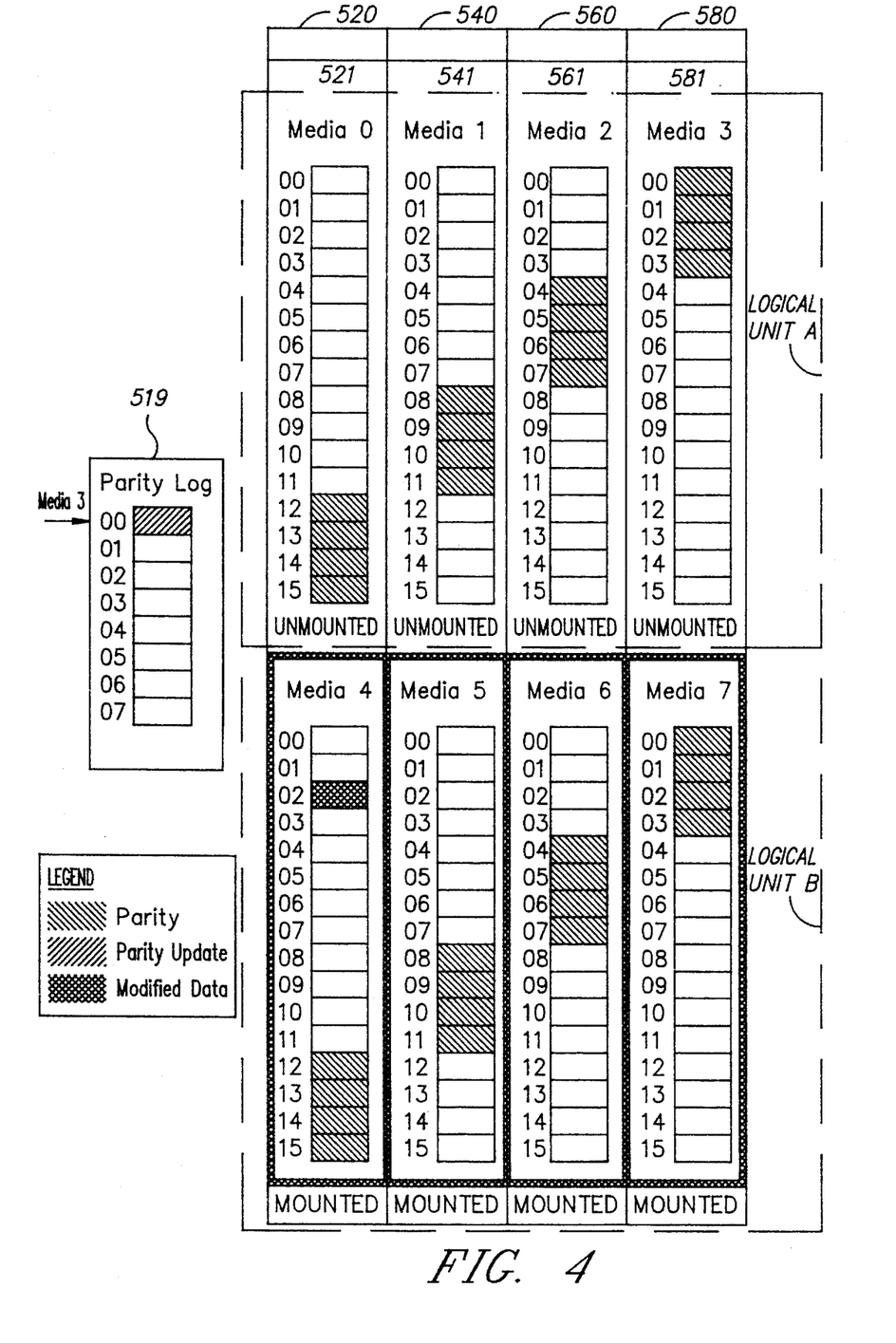
FIG. 4 is a block diagram illustrating the example of FIG. 3 after the parity updates in the parity log have been reintegrated with the data on a media unit.

The state of the array in FIG. 3 after the write of media 4, block 02 is illustrated in FIG. 4. The mount of media 4 for the purpose of writing block 02 offered the opportunity to reintegrate new parity into blocks 12–15 on media 4 based on any parity updates stored in the parity log. (The actual process is to retrieve the parity updates corresponding to parity blocks 12–15 on media 4 from the parity log, read the old parity blocks 12–15 on media 4, XOR the retrieved parity updates with the old parity to compute the new parity, and write the new parity to blocks 12–15 on media 4).

The parity for media 4 block 02 is located on media 7 block 02. Because media 7 is currently mounted the new parity block 02 is computed and written along with the write of the new data to media 4 block 02. (The actual process is to read old data in media 4 block 02 and XOR with new data to compute the parity update, read the old parity in media 7 block 02 and XOR with the parity update just computed to compute the new parity, and write the new parity to media 7 block 02). The parity update for media 3 remains in the parity log, awaiting a data access of media 3 sometime in the future.

Parity Pursuit Striping

Figure 5A:
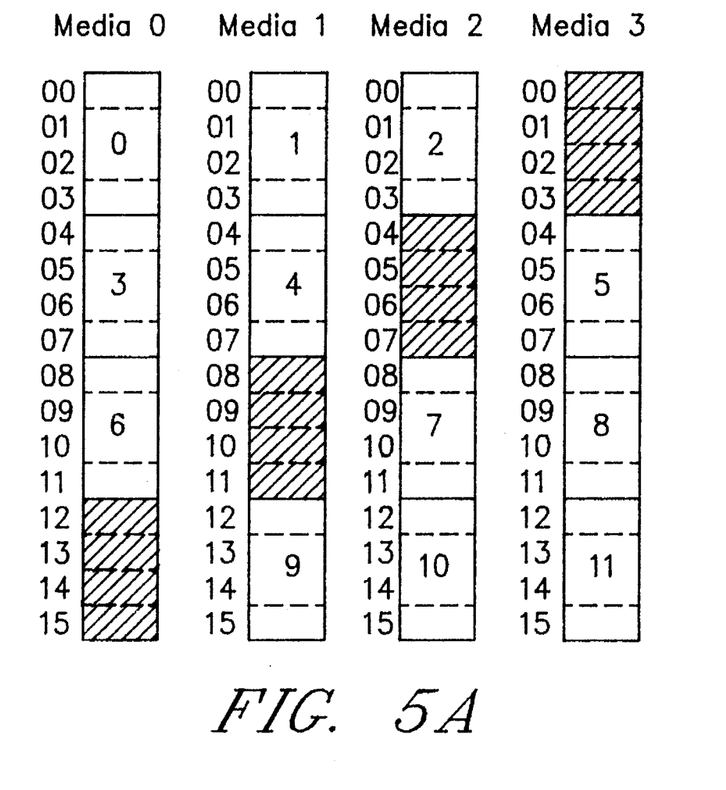
FIG. 5A is a block diagram illustrating conventional round-robin parity striping.

Performance of the array will be improved and the size of the parity log will be reduced if the frequency and timeliness of parity reintegration opportunities can be increased beyond that attainable with conventional striping. The assignment of striping increments to media units can be manipulated to increase the frequency of opportunistic parity reintegration. In a conventional mapping of striping increments to media units, logically successive striping increments are distributed in a round-robin manner from one successive media unit to the next. An example of a conventional round-robin method of mapping the striping increments to the media units is illustrated in FIG. 5A. Logical striping increment 0 is mapped to blocks 00–03 on media 0, logical striping increment 1 is mapped to blocks 00–03 on media 1, logical striping increment 2 is mapped to blocks 00–03 on media 2, the parity stripe for striping increments 0—2 is mapped to blocks 00–03 on media 3, and logical striping increment 3 is mapped to blocks 04–07 on media 0. This successive mapping continues in sequential order on the media until the last striping increment 11 is mapped to blocks 12–15 on media 3.

This mapping is simple and easy to compute, but is not necessarily the most efficient one for parity protected data stored on dismountable media. In the preferred embodiment of the present invention each striping increment is mapped to the same media unit that contains the parity stripe for the previous logical striping increment. In such a mapping technique, a write operation that modifies one striping increment, creating a parity update value that can be stored in the parity log, and then modifies the next logically successive striping increment, results in a much more timely opportunity to write new parity. This is because the new parity to be written will always be on a media unit that is already mounted. This technique of having the striping increment pursue the position of the parity stripe from one media unit to another reduces both the expected size of the parity log and the time needed to store a parity update while waiting for a reintegration opportunity.

Figure 5B:
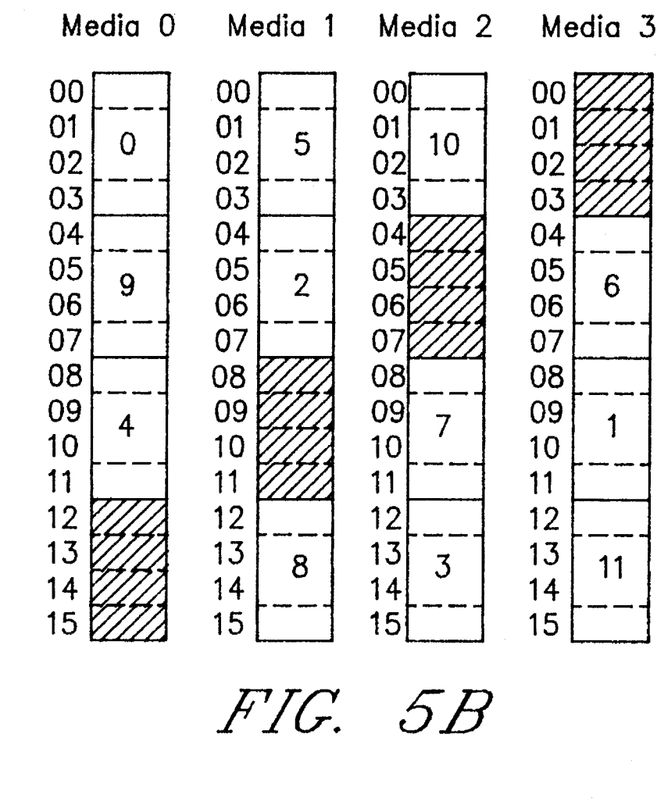
FIG. 5B is a block diagram illustrating parity pursuit striping according to the present invention.
Figure 6A:
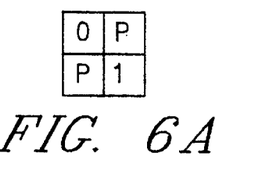
FIGS. 6A–6E illustrate the parity pursuit striping mappings for different arrays having from 2 to 6 media units, respectively.
Figure 6B:
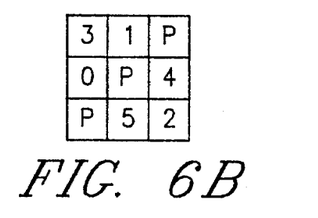
Figure 6C:
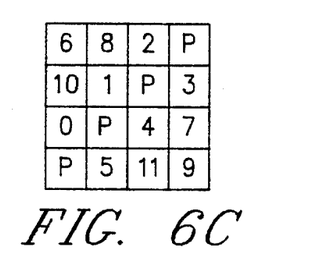
Figure 6D:
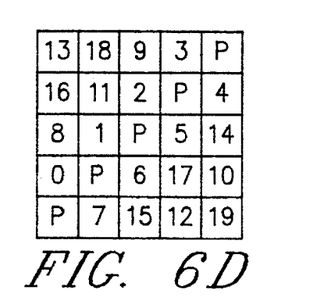
Figure 6E:
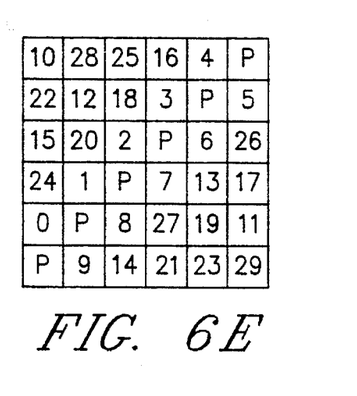

FIG. 5B illustrates parity pursuit striping. Logical striping increment 0 is mapped to the same blocks 00–03 of media 0 as in the conventional striping of FIG. 5A, but now logical striping increment 1 is mapped to blocks 08–11 on media 3. It is mapped to media 3 because the parity stripe protecting the previous logical striping increment 0 is on media 3 (blocks 00–03). Likewise, the parity stripe protecting logical striping increment 1 is on media 1 (blocks 08–12), so logical striping increment 2 is mapped to blocks 04–07 on media 1. Parity pursuit striping continues in this manner. The last striping increment, increment 11, is mapped to blocks 12–15 on media 3 because media 3 (blocks 00–03) contains the parity stripe protecting the previous striping increment 10 on media 2 (blocks 00–03).

A set of parity pursuit striping mappings for arrays having 2 to 6 media units is given in FIGS. 6A–6E. Many different mappings exist for each array width. Some mappings may be better than others, depending on the host computer application. For instance, a parity pursuit striping mapping that tended to place successive logical striping increments on a few media units (rather than uniformly across all units) might have better performance because it would tend to access media units that were already mounted.

Figure 7:
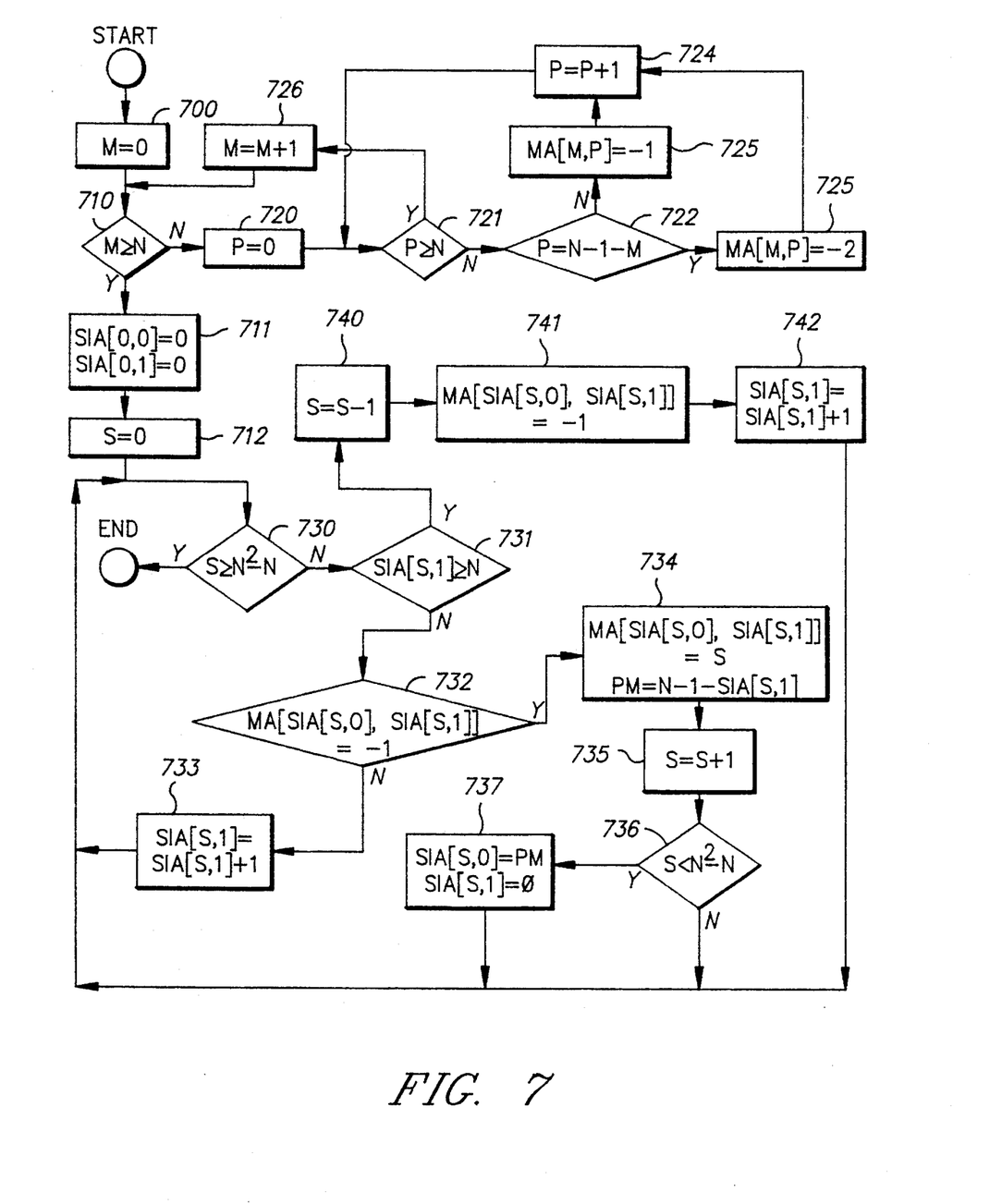
FIG. 7 is a flow chart illustrating the steps in selecting a parity pursuit striping mapping of the type shown in FIGS. 6A–6E.

FIG. 7 is a flow chart illustrating the algorithm for the construction of a parity pursuit striping mapping like one of the ones shown in FIGS. 6A–6E.

The algorithm uses two data structures, the first, "MA" (media assignment), keeps track of which logical striping increments have been assigned to the various positions available on the set of media units in the redundancy group. MA is a two-dimensional array with N rows and N columns, where N is the number of media in the redundancy group (in this explanation N includes the additional media for parity and is thus the same as N+1 used to explain the RAID 5 architecture). Examples of completed MA arrays of different sizes are shown in FIGS. 6A–6E. The first index (zero origin) of MA is a media number from 0 to N−1, the second index (zero origin) is a striping increment position on a media unit and ranges from 0 to N−1. The second data structure, "SIA" (striping increment assignment), keeps track of the media positions of each logical striping increment. It is represented as a two-dimensional array with $N^2-N$ rows and 2 columns. There is one row (zero origin) for each logical striping increment. The first column (index 0) of each row is the index of the media unit the striping increment has been assigned to and the second column (index 1) is the specific position on that media unit. When the algorithm is complete, both data structures will have representations of the parity pursuit mapping, MA indexed by media unit and position to give the logical striping increment index, and SIA indexed by logical striping increment index to give media index and position. SIA will be used later in the description of the processing of access requests.

In the flow chart of FIG. 7, five variables are used: N, the number of media; M, a media index value; P, a striping index position on a media unit; S, a logical striping increment index (range 0 to $N^2-N-1$); and PM, the index of the media unit that stores the parity stripe that corresponds to a particular striping increment position on a different media unit.

The first operation (700) is to initialize the media index M to 0, the first (leftmost) media unit in the redundancy group. Next, a test (710) is done to see if each media unit has been processed. This is part of an initialization process for MA that stores the value −2 at all positions in the array where P=(N−1−M) (i.e., along the diagonal from the lower left corner to the upper right corner), and −1 everywhere else. The value −2 represents those positions occupied by parity (ala RAIL/RAID 5), the value −1 represents striping increment positions to which no striping increments have been assigned. This process starts by initializing P to 0 (720), the first position on a media unit. A test (721) is then done to see if all of the positions on the media have been processed. If yes then the media index (726) is incremented and tested (710) to see if all of columns of MA (one for each media unit) have been initialized. If not all of the positions in MA for the media unit have been initialized, a test is done to see if the current one P is the position of parity (722). If it is (723) then the value −2 is assigned to MA[M,P], if it is not (725) the value −1 is assigned to MA[M,P]. In either case, the position index (724) is incremented and then testing is done to see if all positions on the current media have been processed.

After the initialization of the media assignment array MA, initialization begins for the first entry of the striping increment assignment array SIA, by setting both the media and position of the first logical striping increment (index 0) to be media unit 0 and position 0 (711). The striping increment index S is then initialized to be 0 (712). The algorithm proceeds by trying to assign each logical striping increment in succession to the media units such that each striping increment is placed on the media unit that also contains the parity stripe that corresponds to (i.e., protects) the previous logical striping increment. The algorithm halts when all of the striping increments have been assigned (730). While it is still determining assignments, the first test it makes is to determine if there exists a position to assign the current logical striping increment (731). If there is, the position is tested (732) to determine if it is currently unassigned (i.e., value −1). If it is occupied (some other value), the algorithm moves on to the next position on the media (733) and the process is repeated. If the position is unassigned, the current logical striping index value is stored into MA and PM is computed. PM is the media index of the media that stores the parity stripe that corresponds to the position of the logical striping increment (734). The algorithm then moves on to the next logical striping increment (735), and if it hasn't completed yet (736) it initializes the next logical striping increment to start looking at the first position on the parity media (737).

If the algorithm determines at some point (731) that it cannot find a position on a media unit for a logical striping increment, it will backtrack to the assignment of the previous logical striping increment (740), unmark the assignment for that striping increment (741) and move on to the next position assignment on that media (742), repeating this process as necessary.

Figure 8:
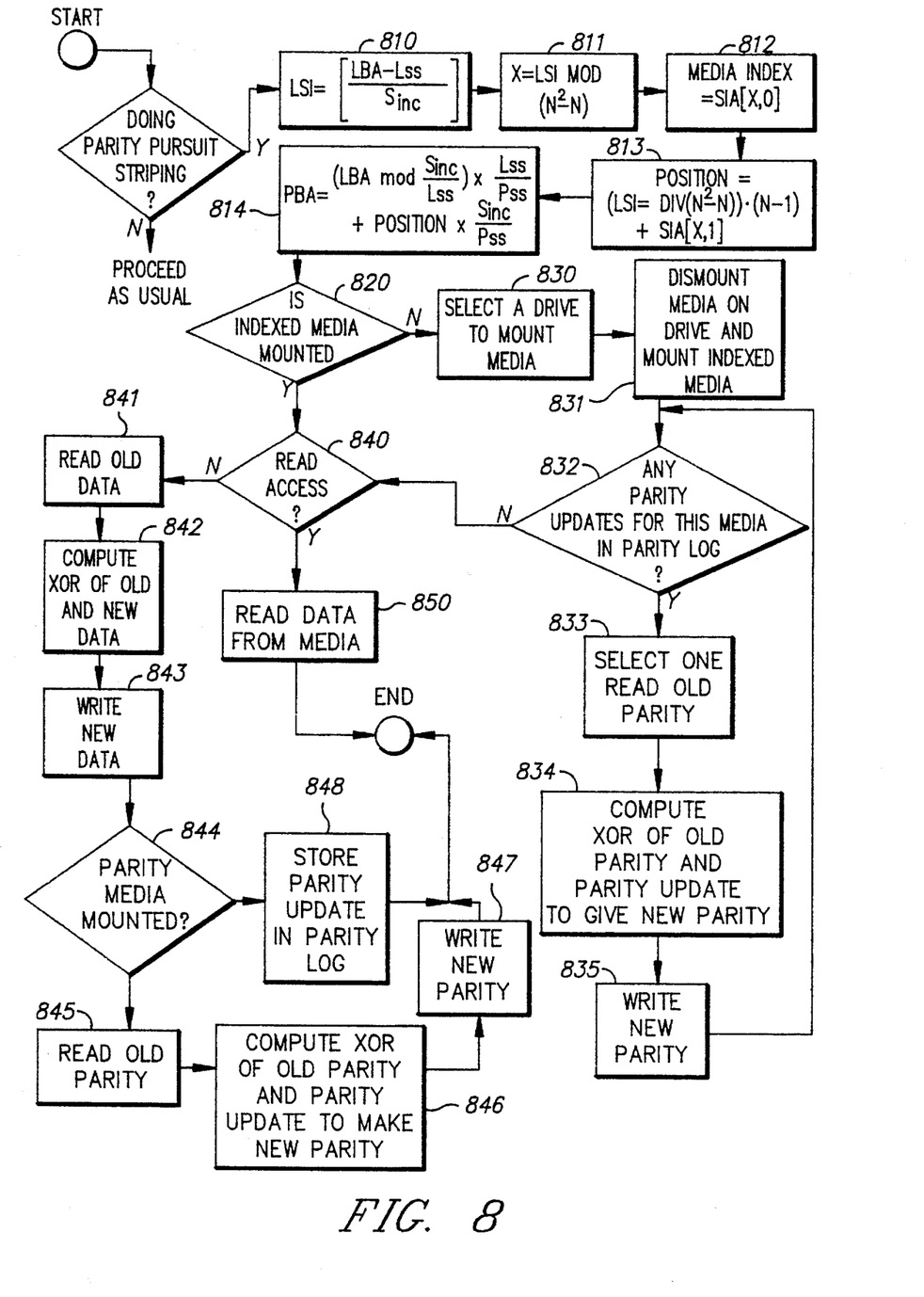
FIG. 8 is a flow chart illustrating the operation of the system to process data access requests using parity logging, opportunistic parity reintegration and parity pursuit striping.

Operation of the System with Opportunistic Parity Reintegration and Parity Pursuit Striping FIG. 8 is a flow chart illustrating the processing of data access requests with opportunistic parity reintegration and parity pursuit striping.

The parity pursuit mapping table SIA is central to the processing of access requests. It records a logical mapping between striping increments and the media units that make up the redundancy group. The mapping starts with the first striping increment on media unit 0 position 0 and is repeated as necessary to completely specify the mapping of all striping increments to the media units.

The inputs to the processing of access requests are the logical block address (LBA), the logical block size (Lss), the size of the striping increment (Sinc), the number of media unit including parity (N), the mapping table SIA and the physical block size on the media unit (Pss).

The processing of access requests begins with the computation of the logical striping index LSI from the logical block address (810). The index X of the striping increment relative to the mapping table SIA is then computed (811) and the media unit number is retrieved from the table (812). The position of the striping increment on the media unit is then computed by determining the number of times the mapping table needs to be repeated to achieve the position of the logical striping increment and multiplying that by the number of striping increments per application (N−1) and then adding on the position within the current application that is read from the table (813). The physical block address is then computed given this position (814). The computation of the physical block address given in 810 through 814 assumes that Sinc≧Lss and that Lss≧Pss. However, it is straightforward to make the proper adjustments to the computations to adapt to different relative sizes for these values.

The process then determines whether the media unit to be written is currently mounted (820). If it is not, then a drive is selected for the mounting of the media unit using some selection criteria, such as least recently used (830). That drive is then dismounted if it currently has a media unit and the desired media unit is then mounted (831). If the parity log has any parity updates to be applied to the parity stored on this media unit (832) then they are selected (833), processed (834) and new parity written (835) on the media unit. When there are no longer any parity updates pending, the processing of the access request determines whether the request is a read or a write (840). If it is a read then the data is read from the media unit and processing completes.

If the request is a write, the old data is read from the physical block computed in 814, the XOR of this old data and the new data being written is performed (842) to compute the parity update, and then the new data is written on the media unit (843). If the media unit that stores the parity for the newly written physical block is not currently mounted (844) then the parity update computed in 842 is stored in the parity log and added to the list of parity updates for that media unit. If the media unit is currently mounted then the old parity is read (845) and the new parity computed by XOR'ing the parity update computed in 842 with the old parity (846). The new parity is then written on its media unit (847). Processing of the write is then complete.

An alternative not illustrated in FIG. 8 is to delay the writing of new parity until after the completion of the write access.

Parity Log Data Compression and Nonvolatile RAM

The parity logging can be improved by employing data compression in the parity log. Compression can be used to reduce the required size of the parity log for a given storage capacity in an array, or to reduce the frequency of forced media mounts required to free up space in the parity log. Because the parity update values generated by XOR'ing new and old data only have bits set at positions where the new data is different from the old data, all other bit values being zero, they lend themselves to efficient data compression, particularly for small writes that only modify a portion of the block. The parity log can be compressed by use of simple run-length encoding as the compression technique.

The preferred embodiment of the present invention has been described with the use of a magnetic fixed disk drive as the nonvolatile storage medium for the parity log. However, other types of memory can also be used to store the parity log. For example, the use of nonvolatile random access memory (NVRAM) with the parity logging RAIL system is an extension that allows parity update values to be collected until enough for a full block transfer has accumulated, thus avoiding several Input/Output operations on the parity log to add accumulated values. This is especially advantageous if parity log compression is employed, as compressed parity update values may be substantially smaller than a single block of secondary storage and so will reduce secondary storage accesses. NVRAM is also useful for storing the pointers to the parity update logs for each of the media units. The alternative is to store the pointers on the same magnetic fixed disk that stores the parity log.

While the preferred embodiments of the present invention have been illustrated in detail, it should be apparent that modifications and improvements may be made to the invention without departing from the spirit and scope of the invention as described in the following claims.

What is claimed is:

1. A data storage library system for storing data to and retrieving data from media units, the system comprising:

a computer;

a plurality of data storage drives coupled to the computer;

a plurality of media units greater in number than the number of drives and mountable to and dismountable from the drives, the media units being arranged into redundancy groups;

a nonvolatile computer-readable memory;

a computer-readable memory encoded with a computer program for causing the computer to (a) organize the data to be stored into data sets, each data set including data blocks and an associated parity block, the number of data blocks plus the parity block in a set being equal to the number of media units in a redundancy group; (b) write the data by striping the data blocks and the parity block in a set across all of the media units in the redundancy group, and by distributing the parity blocks for different sets among different media units in the redundancy group; (c) log into the nonvolatile memory parity updates computed when the data blocks previously written to the media units in the redundancy group are to be modified; (d) write modified data blocks onto the media units without writing a corresponding new parity block if the media unit containing the corresponding parity block to be updated is not mounted on a drive; (e) retrieve the parity update from the log; and (f) write a new parity block based on the retrieved parity update to the media unit containing the parity block to be updated when the media unit containing the parity block to be updated is later mounted on a drive.

2. The data storage library system according to claim 1 wherein the computer-readable memory encoded with a computer program causes the computer to write a new parity block based on the retrieved parity update by exclusive or'ing the retrieved parity update with the parity block to be updated.

3. The data storage library system according to claim 1 wherein the computer-readable memory encoded with a computer program also causes the computer to write the new parity block to the media unit containing the parity block to be updated without logging the parity update if the media unit containing the parity block to be updated is already mounted at the time the parity update is computed.

4. The data storage library system according to claim 1 wherein all the data blocks and parity blocks in the data sets for the media units in a redundancy group are mapped across the media units in successive striping increments so that a striping increment is located on the same media unit that contains the parity blocks corresponding to the prior striping increment.

5. The data storage library system according to claim 1 wherein all the data blocks in a redundancy group are organized into a set of striping increments, each striping increment containing the same number of fixed data blocks.

6. The data storage library system according to claim 1 wherein the parity updates stored in the parity log of the nonvolatile memory are organized as a linked list of parity update blocks, one parity update block for each media unit in the redundancy group.

7. The data storage library system according to claim 1 wherein the nonvolatile memory for logging updated parity blocks is a magnetic fixed disk drive.

8. The data storage library system according to claim 1 wherein the system includes a plurality of independent data storage libraries, each library including at least one of said plurality of data storage drives, at least two of said media units, and a picker for mounting the media units to and dismounting the media units from said at least one drive.

9. An array of independent optical disk libraries for connection to a computer having a nonvolatile memory and a computer-readable memory, the libraries enabling data to be stored to and retrieved from a plurality of dismountable optical disks, the array comprising:

a plurality of optical disk libraries, each library including at least one optical disk drive, at least two disks associated with each drive and a picker for mounting the disks to and dismounting the disks from the drives; wherein the disks in the plurality of libraries are arranged into redundancy groups, each disk in a redundancy group being associated with a unique drive; and a computer program encoded into the computer-readable memory, the computer program comprising:

(a) computer program code for organizing the data to be stored into parity groups assigned to redundancy groups, each parity group including data striping increments and an associated parity stripe, the number of data striping increments plus the parity stripe in a parity group being equal to the number of disks in a redundancy group;

(b) computer program code for causing the data to be written by striping the data striping increments and the parity stripe in a parity group across all of the disks in the assigned redundancy group, and by distributing the parity stripes for different parity groups among different disks in the assigned redundancy group;

(c) computer program code for causing to be logged into the nonvolatile memory parity updates computed when the data striping increments previously written to the disks in any of the redundancy groups are to be modified;

(d) computer program code for causing modified data striping increments to be written onto the disks in any of the redundancy groups without writing a corresponding new parity stripe when the disk containing the corresponding parity stripe to be updated is not mounted on a drive;

(e) computer program code for causing the parity update to be retrieved from the log and a new parity stripe based on the retrieved parity update to be written to the disk containing the parity stripe to be updated when the disk containing the parity stripe to be updated is mounted on a drive; and (f) computer program code for causing a new parity stripe to be written to the disk containing the parity stripe to be updated without logging the parity update if the disk containing the parity stripe to be updated is already mounted at the time the parity update is computed.

10. The array according to claim 9 wherein all the data striping increments in the parity groups for the disks in a redundancy group are mapped across the disks in successive striping increments so that a striping increment is located on the same disk that contains the parity stripe protecting the prior striping increment.

11. The array according to claim 9 wherein the parity updates stored in the parity log of the nonvolatile memory are organized as a linked list of parity update blocks, one parity update block for each disk in each of the redundancy groups.

12. The array according to claim 9 wherein the nonvolatile memory for logging parity updates is a magnetic fixed disk drive.

13. In a data storage library system of the type having a nonvolatile storage, a plurality of data storage drives and a plurality of media units mountable to and dismountable from the drives, the media units being arranged into redundancy groups, a method for managing the writing of data and redundant parity information to the media units in the redundancy groups comprising the steps of:

organizing the data to be written into data sets, each data set including data blocks and a corresponding parity block, the number of data blocks plus the parity block in a set being equal to the number of media units in a redundancy group;

writing the data blocks by striping the data blocks and the parity block in a set across all of the media units in the redundancy group, including distributing the parity blocks for different sets among different media units in the redundancy group;

prior to writing a new data block over a previously written data block, computing a parity update by exclusive or'ing the previously written data block with the new data block not yet written;

if the media unit containing the corresponding previously written parity block is mounted on a drive when the parity update is computed, reading the previously written parity block, exclusive or'ing the computed parity update with the previously written parity block to compute a new parity block, and then writing the new data block over the previously written data block and the computed new parity block over the previously written parity block;

if the media unit containing the corresponding previously written parity block is not mounted on a drive when the parity update is computed, writing the new data block over the previously written data block without writing a corresponding new parity block and logging the computed parity update in a parity log in the nonvolatile storage; and when the media unit containing the corresponding previously written parity block later becomes mounted on a drive, retrieving the parity update from the parity log, reading the previously written parity block, exclusive or'ing the retrieved parity update with the previously written parity block to compute a new parity block, and then writing the computed new parity block over the previously written parity block.

14. The method according to claim 13 further comprising the step of mapping all the data blocks and parity blocks in the data sets for the media units in a redundancy group across the media units in a redundancy group in successive striping increments by locating a striping increment on the same media unit that contains the parity block corresponding to the prior striping increment.

15. The method according to claim 13 wherein the step of logging the parity updates includes organizing the parity updates in the parity log as a linked list of parity update blocks, one parity update block for each media unit in the redundancy group.

16. The method according to claim 13 further comprising compressing the logged parity updates.

* * * * *